United States Patent [19]

Schumacher

[11] 4,251,709
[45] Feb. 17, 1981

[54] PROCESS FOR JOINING METALS

[76] Inventor: Berthold W. Schumacher, 24635 Winona, Dearborn, Mich. 48124

[21] Appl. No.: 974,306

[22] Filed: Dec. 29, 1978

[51] Int. Cl.³ .............................................. B23K 15/00
[52] U.S. Cl. ....................... 219/121 ED; 219/121 EG; 219/121 LD; 219/121 LF
[58] Field of Search ..... 219/121 L, 121 LM, 121 EB, 219/121 EM, 121 EG, 121 ED, 121 LD, 121 LF

[56] References Cited

U.S. PATENT DOCUMENTS

| | | | |
|---|---|---|---|
| 3,172,007 | 3/1965 | Hanks et al. | 219/121 EB X |
| 3,244,412 | 4/1966 | Robinson et al. | 219/121 L |
| 3,275,787 | 9/1966 | Newberry | 219/121 EB |
| 3,310,423 | 3/1967 | Ingham, Jr. | 219/121 L X |
| 3,626,140 | 12/1971 | Peyrot | 219/121 L X |
| 4,048,459 | 9/1977 | Earle | 219/121 LM |
| 4,117,302 | 9/1978 | Earle et al. | 219/121 LM |
| 4,125,926 | 11/1978 | Gale et al. | 219/121 LM X |

*Primary Examiner*—C. L. Albritton

[57] ABSTRACT

A method is disclosed for joining two or more pieces of metal along a seam line by directing a jet of liquid metal onto the seam, the surfaces of which, at the seam region of the metals to be joined, have been pre-melted just before the liquid metal jet is poured on, the pre-melting being done by an energy carrying beam of radiation, e.g. an electron beam or a laser beam, of high power density, a mixture of molten metals thus being formed which thereafter will cool, solidify, and thereby join the various metal pieces into a single welded structure.

By making the power and power density of the radiation beam used for pre-melting sufficiently high, only a thin surface layer is melted rapidly; it will adhere to the underlying solid interface by natural adhesion. On account of the rapidity of the melting only a minimum of the beam energy is lost by heat conduction. No beam energy is used up for melting the liquid metal jet; the latter also acts as filler for any size of gap in the seam area. Thus, the energy for the melt coming from two different sources, not only from the radiation beam, this joining process is faster than conventional electron beam or laser beam welding and it can accommodate larger joint gaps.

The same process can be used to clad a pre-melted metal surface by a thin layer of another metal supplied by the liquid metal jet.

8 Claims, 8 Drawing Figures

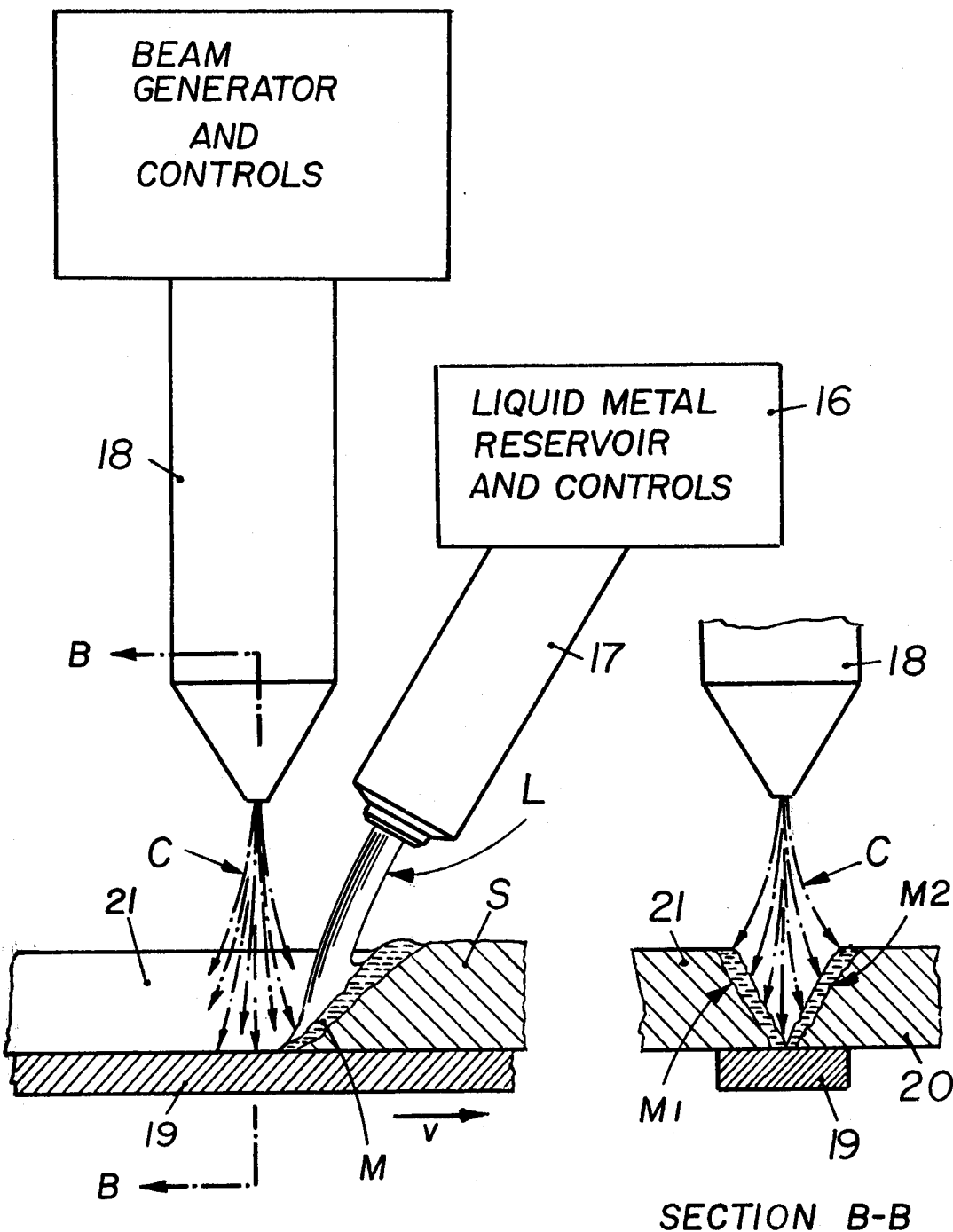

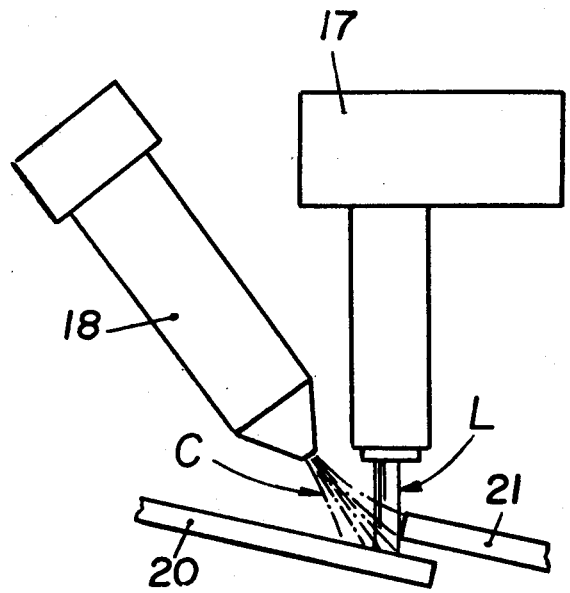
FIG. 2a
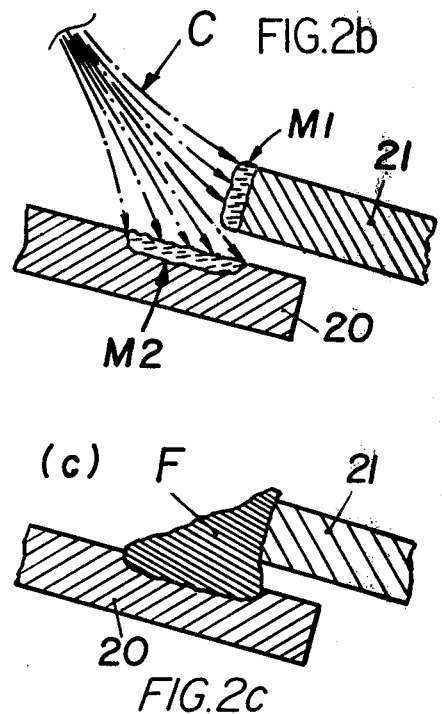
FIG.2b
FIG.2c
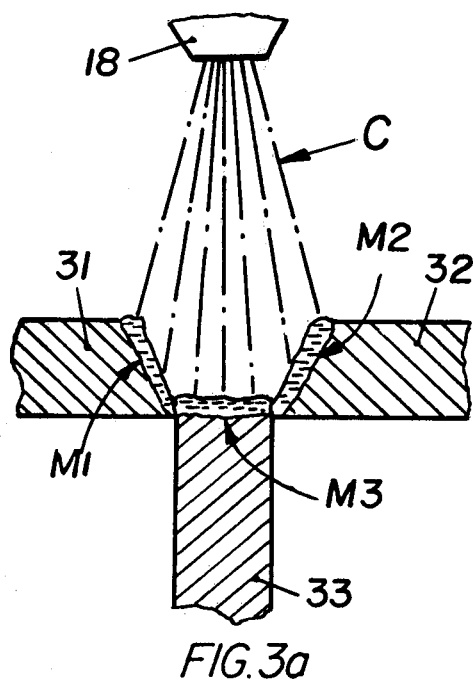
FIG.3a
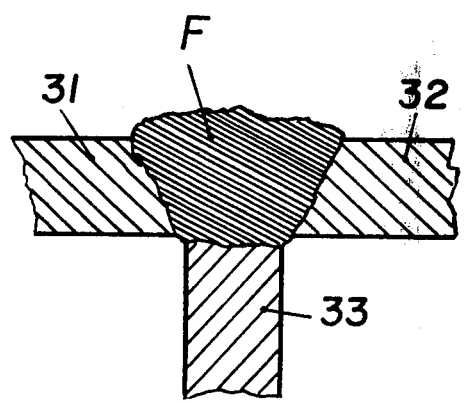
FIG.3b

PROCESS FOR JOINING METALS

BACKGROUND OF THE INVENTION

There exists a need for a better, more adaptable, and particularly a faster method for joining metals. Presently, the two most widely used methods are soldering and welding.

In any of the well known soldering or brazing processes the joint between the two metal parts, consisting of either the same or different metals, is made by means of another metal which has a melting point well below that of the metals to be joined. Adhesion of the solder-metal to the solid surfaces of the parts to be joined is assured by various means, e.g. the removal of oxide layers by means of fluxes, by means of mechanical abrazion, or by both. The solder metal adheres to the parts' surfaces through physical adhesion (van-der-Waals forces between the atoms and molecules). Solder metal atoms may also diffuse into the solid metal to a depth of a few atomic layers; yet, only the solder metal is ever melted in the process, the parts to be joined, including their surface, remain solid at all times. These processes have also been called "Liquid-Solid Phase Joining", for instance in the book by George E. Linnert "Welding Metallurgy" (3rd edition, 1965, The American Welding Society, New York).

In a related type of process, surfaces of one type of metal are being covered with another type of metal, or with metal oxides and carbides, by spraying them against the surface in the form of heated or sometimes melted fine particles. They may be heated and fed through a oxyfuel-gas flame, the detonation of an oxyfuel gas mixture, or an electric arc. Trade names used for this process are "metallizing", "flame spraying" and "plasma plating". The surfaces to be coated are not melted. The process is so slow that, if enough heat were supplied to melt the surface, the whole workpiece would melt. At the impact point of the particles there may be, however, some locallized melting.

Surfaces have also been altered by locallized heating and melting under a high power density laser beam or electron beam. The rapid self-quenching which a thin heat-zone experiences can lead to a hardening effect due to phase changes (in the solid metal). The particles on a flame-sprayed surface have also been re-melted, in order to fuse or braze them to the underlying solid surface; a brazing flux is sometimes mixed-in with the particles when they are sprayed on. Compared with these practices, the novel process described here, even when it is used for surface cladding (i.e. joining a surface layer of one metal onto another metal), is decidedly different, insofar as the original surface of the bulk metal part is everywhere truely melted in the process.

When joining two metal parts by fusion welding the adjacent regions of these parts themselves are being melted, the melt then forming one single melt-puddle, which subsequently solidifies, thus producing a solid metal connection between the parts. The numerous methods which can be applied to weld in the just indicated manner, include, for instance, a flame, an electric arc, a corpuscular beam such as an electron beam, a light beam such as a laser beam, resistive heating by an electric current, heating and melting by friction or by ultrasonic vibrations.

The term welding is also applied to some solid to solid bonding methods, which all apply pressure, usually by mechanical means, sometimes by the use of explosives. In the present context we don't need to discuss these methods.

Soldering as well as welding have their specific advantages and disadvantages. A solder joint is usually weaker than a weld, but it permits greater mechanical precision to be maintained, there are less thermal stresses and distortions. For soldering, the parts must be fitted precisely, although solder metal can be used to fill gaps. The joint is then usually weak. In welding, gaps between the parts can be filled by melting down a sufficient amount of "filler" or "welding wire" or "welding rod", which consists usually of a metal alloy closely similar to the metal of the parts which are to be joint. It is supplied as solid wire or rod. When welding thick pieses, a pre-machined V-groove is filled up by depositing successive "ropes" of metal from a welding rod or wire, one rope being layed on top of the other. The filler or welding rod is melted at the same time and together with a locallized region of the work piece. Any of the heating methods used in autogenous welding (i.e. without addition of other metal) which have been mentioned above, can be used for welding with a filler as well.

The fact that the welding rod and a part of the work piece must be melted at the same time, for instance by the same electric arc, poses certain difficulties, one of them being that a great amount of heat flows into the work piece leading to thermal stresses and distortions. The newer processes of welding with a laser or electron beam minimise the heat input because of the great power density which they make available and which permits locallised melting of the work piece before much energy has been conducted into the interior of the piece by heat conduction. The conditions which must be met to achieve this kind of "quasi-adiabatic" melting of a surface layer have recently been analyzed and described by me. (Paper entitled: "Quasi-adiabatic melting and vaporization due to a radiation beam of high power density" published in OPTIK, vol. 39, 1974, p. 558–580; in English). Even when welding with such high power-density radiation beams is it possible to feed a welding wire into the beam or into the beam generated melt-puddle in order to fill up gaps between the pieces to be joined. However, since the process operates with a minimum of excess energy, yet differences in the width of the gaps require different amounts of metal to be deposited, the control of the process becomes very difficult when filler wire is required. In order to maintain the conditions for minimum heat conduction losses, the melting of the surface must proceed extemely rapidly, and no time and energy must be waisted in melting a filler wire, or the advantages of the beam welding processes are lost. The above are obviously partly incompatible requirements. The invention described here later shows how this incompatibility can be overcome.

Although the electron beam, and to a lesser extend the laser beam, can make single-pass welds in fairly thick plates (up to a thickness of 5 cm with a 60 kW electron beam in air, up to 30 cm in vacuum) the energy input still takes place on a surface, in this case the surface of what has been called a "key hole" or a "crater" which penetrates the work piece to the thickness of the weld. A mathematical analysis of some aspects of this process has been provided by J. H. Fink (Welding Research Supplement to the Welding Journal, May 1975, pages 137s–153s). Thus it is quite justified to speak of a radiation beam as being essentially a surface heating source, as we do in the following, and although its small but finite depth of penetration into the surface is of great significance (see OPTIK 39,558, quoted above).

The new process, described below, utilises the inherent, special capabilities of these high power-density radiation beams, namely their capability to melt a thin surface layer only to the fullest extend. No attempt is made to fuse the parts, based on this energy source alone. Thus, the new process permits joining at speeds equal to or exceeding those of conventional electron beam or laser beam welding—and it retains the advantage of minimum heat input into the work piece.

SUMMARY OF THE INVENTION

In the new method for joining metal parts, a liquid jet of molten metal is sprayed at the joint, while a very short time earlier a thin surface layer of the parts to be joined has been melted by a radiation beam of high power-density. The subsequent solidification of the liquid metal then produces a solid metallic joint with all the properties of a weld joint, although the process resembles more closely a soldering process. The liquid metal jet may be of the same or a closely similar constituency (alloy) as the parts to be joined; but it can also be of a different metal. The molten surface metal mixes with the metal from said metal jet.

The application of molten metal to the joint by means of the liquid metal jet has several destinctive advantages: no additional heat for melting various amounts of filler metal must be fed into the joint region proper, thus there is no problem with over-heating, under-heating, or heat input control in general; the liquid metal jet can be directed and aimed at the gap of the joint, one does not need to rely on gravity to deposit the metal correctly in the gap, as is the case with droplets melted off of the end of a welding rod. There are no electromagnetic forces acting on the liquid jet and the molten surface layer, as is the case in electric arc welding, forces which can move the liquid metal around in an undesirable way and must be controlled (by the positioning or the welding rod or current lead or other measures). Variations in the gap width do not require variations in the energy input from the radiation beam, since the energy required for melting the surfaces is always the same and no heat-of-melting must be supplied to the already molten filler metal jet. An over-supply of the liquid filler metal does not quench the melt or weld, but leads only to an additional built-up of weld-bead, leaving a higher "crown" on the finished weld.

As in any other welding process, it may be advantages to use as a filler metal an alloy of a slightly different composition than that of the parts to be joined, so as to achieve specific properties of the weld seam. In the extreme case of welding dissimilar metals, one may even use a third type of metal as filler metal, as has also been done in other cases of welding. Pre and post-heating may be applied in order to control or influence the cooling rate.

VARIATION OF THE METHOD

The process is capable of still another variation, which has not yet been mentioned above. The liquid metal jet is given a temperature which is considerable higher than its melting point, so that the jet carries a certain amount of excess energy. For iron, for instance, the melting point is 1,535° C., the boiling point at atmospheric pressure is 2,735° C.; a jet of liquid iron of 2,000° C. is therefore stable and will not boil at atmospheric pressure. The surfaces on the joint are again pre-heated by a beam of radiant energy, but in this version of the method to a temperature just below the melting point. The liquid jet is directed at these pre-heated surfaces and, on account of its excess energy and temperature, melts the surface where it impinges on it. The pre-heating is essential; it is known that a small amount of liquid metal splashing at a cold surface of the same type of metal will not melt this surface.

It will be appreciated that, depending on the type of metal to be joined, the whole process may have to be performed in a protective atmosphere, so as to avoid oxydation. The use of protective atmospheres or "shielding gases" is nothing new to the art. The parts may also be placed in a vacuum chamber, which provides the ultimate protection against oxydation. Fluxes which decompose may form the protection.

FURTHER ELABORATION ON THE INVENTION

It has been stated that the radiation beam, which is used to heat and melt a surface layer on the parts to be joined, must have sufficient power density to accomplish this task. It is obvious, that with insufficient power-density all the energy will be conducted away by heat conduction without the surface starting to melt. For instance, when sun light is focused on a block of iron, even by a fair sized lens, it will never melt the block's surface; In a thin sheet of iron it may, when applied long enough, melt a hold in the sheet. Similarly, heat transfer from a flame is also insufficient for melting only a thin surface layer without a significant temperature rise generated in the bulk of the work piece. On the other hand, the power-density in the focus of a laser, or the power-density in an electron beam (even outside of a focus), has been found to be so high as to melt a thin surface layer instantly, before heat conduction had time to raise the temperature of the bulk of the material significantly. This provides us with an advantage, but it poses a difficulty at the same time. In electron beam welding (for instance with a beam in air, as described by Lowry, Fink, and Schumacher in Journal of Applied Physics 47 (1976), 95–106) more than a thin surface layer of metal must be melted, on each of the parts to be joined, in order to fill gaps and provide an acceptable fusion weld. But, although the beam power and power density may be increased readily, heat conduction is too slow to melt sufficient metal fast enough; instead, the surface layer temperature rises until the liquid metal begins to boil. If boiling occurs, the weld becomes porous and otherwise unacceptable. Thus, neither can the welding speed be increased beyond a certain value, nor can larger gaps between the pieces be filled-in by increasing the beam power-density. Increasing the Power and holding the power-density the same by broadening the beam, and then feeding filler wire into one part of the beam, is possible, but difficult to control if gap width varies. The necessity for melting bulk metal without getting surface-boiling still limits the welding speeds. Slowness of heat conduction, a limit posed by nature, can not be overcome.

The beam power density needed for either melting or boiling a minimum thickness surface layer (equal in thickness to the penetration depth of the radiation) has been derived for various metals (B. W. Schumacher, OPTIK 39, 1974; quoted above). For 150 kV electron beams this power density is: $N^* \geq 112\rho^2 H^* \lambda^*$ Watt per square centimeter. In this equation $\rho$ is the density of the metal, H* is the total heat input needed for melting or evaporation, as the case may be, and λ* is the thermal diffusivity of the material bombarded by the beam. Given this power density, and for the traveling speeds also derived in the quoted paper (depending on the total beam power and beam spot size) only 10% of the beam power is lost by heat conduction, 90% is utilized for melting (or evaporation respectively). This wall called "quasi-adiabatic" melting. For steel, a typical power density is $10^6$ W/cm$^2$ with process speeds in the order of 20 meter/second. Then a layer of $4 \times 10^{-3}$ cm thickness would be actually melted. A thicker layer gets melted if the process speed (the traveling speed of the beam impact location) is reduced or the power-density is increased beyond the above given minimum for melting (but kept below the minimum for evaporation or boiling). In conventional electron beam welding with high power beams 60% of the beam energy has been utilized for melting metal (40% lost to heat conduction) at process speeds of the order of 0.2 m/sec. For the novel process described here, we can choose any speed between the above values and thereby control the thickness of the pre-molten surface layer onto which the liquid metal jet is directed.

The new process, according to this invention, entirely avoids the necessity for melting of filler material by the radiation beam; this material is pre-melted and supplied as a liquid jet. The inherent capability of the radiation beam to instantly melt a thin surface layer of metal is retained and utilized to the fullest. Thus very high joining speeds are achieved. Since a layer of the pieces to be joint is truely melted, the joint is as strong as a true weld-joint; it is not only a solder joint. Heat input and distortions by thermal stresses are minimized. Existing laser or electron beam welding machines can supply the necessary beams. A typical electron gun for generating the necessary beam and conducting it to the atmosphere is described in U.S. Pat. No. 2,899,556, 1953, of which I am a coinventor.

Generating and applying the liquid metal jet may require some precautionary steps. In order to avoid any premature quenching of the liquid metal jet and of the work region, a hot shield gas may have to be used in some cases. The shield gas may consist of a flame, e.g. a reducing hydrogen flame. Helium or argon, pre-heated by an electric arc to form a hot plasma flame, may also be used.

While this invention is not directed at a particular type of apparatus, it will be helpful to look at a schematic representation of one such apparatus which can be used for practicing this invention.

BRIEF DESCRIPTION OF THE DRAWINGS

For a better understanding of this invention both as to its organization and as to its method of operation together with additional objects thereof, reference is made to the following description taken in connection with the accompanying drawings, in which FIG. 1a and FIG. 1b show schematically the mutual arrangement of an energy beam source, a source for a liquid metal jet, and two work pieces to be joined, where FIG. 1a is a side view and FIG. 1b is a cross sectional view taken along line BB on FIG. 1a.

FIG. 2a shows a different work piece configuration to which this process can be applied, and FIG. 2b is an enlarged detail, namely a cross section taken in the plane of the beam C of FIG. 2a; FIG. 2c is an enlarged cross section through the completed joint.

FIG. 3a shows a cross section through yet another work piece configuration to which this process can be applied, and FIG. 3b shows a cross section through the completed joint made according to FIG. 3a.

Figure 4:
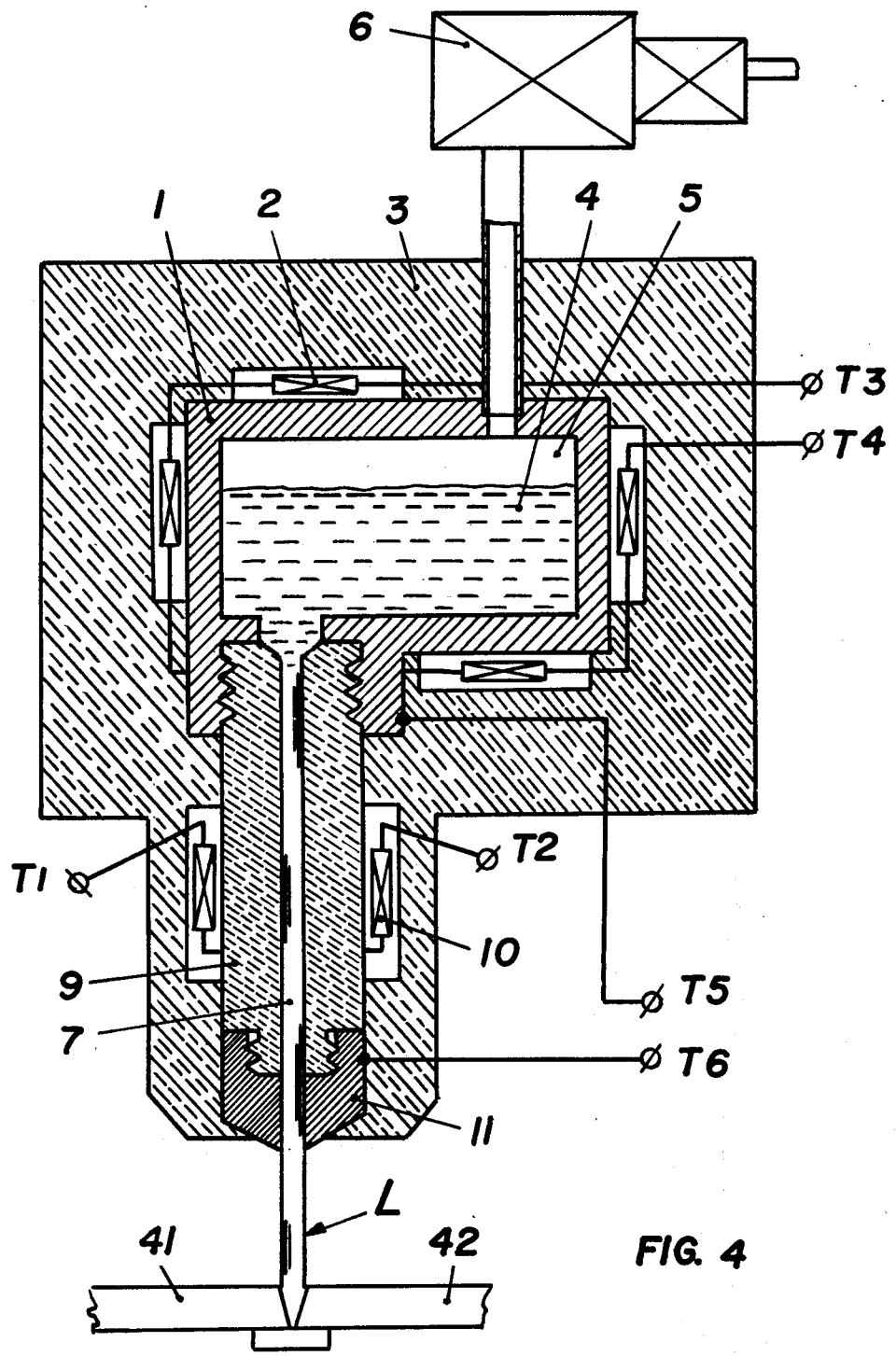

The configurations shown are not meant to be exclusive, the process can be applied to other configurations also.

FIG. 4 shows schematically how a liquid metal jet may be generated.

DESCRIPTION OF APPARATUS

FIG. 1 shows schematically how a V-groove between two metal parts is filled with metal from a liquid metal jet L, after the surface has been pre-heated sufficiently, or even melted, by the bombardment with the corpuscular bean C. By the movement of the workpieces, as indicated by the arrow v, the originally cold V-groove surfaces are first brought under the beam C, to be rapidly heated to near or just above the melting point. Only a thin surface layer is melted, and this molten metal does not flow away to any significant extend, surface tension and adhesion holding it to the underlying, solid interface; some minor metal flow is unavoidable and can be tolerated. Immediately adjacent to the beam region C, the V-groove is filled up with metal from the liquid jet L. While the work piece moves on, a certain layer M remains molten, but further on the metal solidifies due to heat conduction cooling. The solid part of the finished joint is indicated by S in FIG. 1. Furthermore, item 16 represents a liquid metal reservoir and item 17 a capillary from which the metal jet L emerges. Details are hidden underneath the appropriate thermal insulation, but can be seen in the cross section shown in FIG. 4. Item 18 indicates the corpuscular beam generator. Item 19 is a backing strip whicch prevents the liquid metal from dropping out of the V-groove. It is only needed with thicker work pieces where surface tension can not hold the liquid in place. Items 20 and 21 are the work pieces to be joined.

In FIG. 1 the liquid jet L is shown falling into the V-groove on a parabolic curve, as caused by the force of gravity. The inclination of beam C and jet L can be changed, and by applying sufficient pressure behind the liquid jet it can be projected in a more horizontal direction or even upwards. The work piece may also be in another position than the one shown here. Note that surface tension forces will hold the liquid metal to the joint, even if the joint line is vertical or over head, as long as there is not too much liquid present. A practical limit is given by a depth of the liquid of approximately 4 mm.

The width of the particle beam C can be controlled by various means. In case of an electron beam in air, one may just change the distance between the electron gun and the work piece; the scattering of the electrons in the gas will broaden the beam more or less. Periodic magnetic deflection is another method that can be used for broadening the beam impact area, which thereby may also be elongated in the direction of the joint line. Astigmatic focusing may also be used to achieve this effect, in either an electron beam or a laser beam. Finally, the beam and the liquid metal jet may be made to overlap partly; thus additional heat may be imparted to the melt zone in the mixing region. The cooling and freezing rate of the liquid metal may be controlled by additional heat sources (not shown), as well as by pre-heating the parts to be joined. Such procedures are state of the art and are often applied in connection with other welding methods to influence the metallurgical properties of the joint.

FIG. 2 shows how a lap-joint is produced. FIG. 2a is a general front view. Item 18 is the beam generator; C is the beam which it produces. Item 17 is the liquid metal source and L is the metal jet generated by it. Items 20 and 21 are two pieces of metal to be joined. FIG. 2b shows how the radiation beam C generates locallized surface melting, namely in the regions M1 and M2. This happens just an instant before the liquid jet impinges on 20 and 21. It should be imagined that in FIG. 2a L is closer to the viewer and C is slightly behind L. The work pieces 20 and 21 move towards the viewer (out of the plane of the paper) or, alternatively, C and L move away from the viewer (into the plane of the paper). FIG. 2b also shows that it is not necessary that the two parts 20 and 21 are in close contact with one another, as long as only beam C impinges on both of them. FIG. 2c shows a cross section through the finished lap joint, after the metal applied via L has solidified and forms the fillet F.

FIG. 3 shows how 3 metal pieces, items 31,32,33, can be joined by this process. (a) shows the initial set-up of the 3 pieces, being bombarded by the radiation beam C so that each surface is melted, as indicated by M1, M2, M3. (b) shows the finished joint after liquid metal from a jet L (not shown) has been poured on, so as to form a high crown.

While the new process can be used for joining any kind of metal, the generation of a liquid jet is more difficult when metals with higher melting points are to be joined, as for instance in the case of steel. But the inherent requirements can be met with available technology in several ways. FIG. 4 shows an example.

In FIG. 4, item 1 is a crucible which holds a supply of molten metal, e.g. steel. It may consist of graphite, molybdenum, tantalum, tungsten, thoriumoxide, zirconiumoxide, aluminumoxide or any similar material with a melting point higher than that of steel. The crucible 1 is heated by an electric heater 2; the electricity is supplied via the terminals T3 and T4. An insulating layer 3 protects the crucible from excessive heat loss, and the operator from coming in contact with the crucible. The crucible is only partly filled with liquid steel 4; above the liquid there is a space 5 filled with an inert gas, which is pressurized via a valve and regulator system (the essential control elements for the jet), item 6. The jet is formed by pushing the liquid steel through the capillary tube 7, the driving force being provided by the gas pressure in space 5. It emerges into the atmosphere as indicated by L. The flow rate can be instantly altered or the flow started and stopped via the control elements 6.

It is essential to prevent solidification of the metal inside the capillary 7. For this reason the body 9, which holds the capillary tube, and which can be longer than shown here, is heated by another electric heater 10, getting its power through the terminals T1 and T2. Alternate means for heating the liquid jet in the capillary are also provided, namely: the capillary body 9 is made of an electrical insulator, or a material having at least poor electrical conductivity, such as a hot ceramic body (e.g. aluminumoxide), and it is terminated by a metallic nozzle 11 (made, for instance, of molybdenum). An electric current is sent through the metal in the capillary; the required voltage is supplied via the terminals T5 and T6. The capillary body 7 and the nozzle tip 11 are also surrounded by the thermal insulation 3. As another alternative for heating the liquid metal in the capillary 7 an RF-voltage may be supplied to the terminals T1 and T2 so as to generate a heating current in 7 via induction.

Supplying additional heat to the metal in the capillary 7 permits to increase the temperature of the liquid jet beyond and above the temperature in the storage volume 4. This is of particular advantage if extra heat is to be carried by the jet L, as was described as one of the process versions. 41 and 42 are the work pieces to be joined.

Means for generating and maintaining a protective atmosphere around the work area are well known from other welding processes and are not shown in these figures.

No particular configuration of apparatus is claimed for practicing the new joining process, all parts of the apparatus needed being currently available. The combination of a high power density radiation beam with a liquid metal jet is considered the key and novel feature of the new joining process.

I claim:

1. A process for joining metal parts which comprises the following steps:
   (a) directing a radiation beam of sufficiently high power density to cause rapid melting of the surfaces of the metal parts to be joined at an impact location which lies at an intended joint line and
   (b) moving said beam impact location along the line of the joint with a sufficiently high speed so that only a thin surface layer of the parts to be joined is being melted,
   (c) directing a jet of molten metal, coming from a reservoir where said metal has been previously melted, at a point of the joint line immediately behind the beam impact location, said point of the surface being still in the molten state,
   (d) letting the liquid metals of the surface layers and of the metal jet intermix,
   (e) adjusting the flow of the metal jet to fill any gaps in the joint structure, and
   (f) letting this liquid metal mixture solidify by spontaneous cooling to form a solid metal connection between the parts subjected to this process.

2. A process for joining metal parts which comprises the following steps:
   (a) directing a radiation beam of high power density at an impact location which lies at an intended joint line, thereby heating rapidly a thin surface layer at the beam impact location to near the melting point of the metal at the surface, and
   (b) moving said beam impact location along the line of the joint, so that a thin surface layer is heated to near the melting point all along the joint line,
   (c) directing a jet of molten metal, of essentially the same composition as the metal parts to be joined, at a point of the joint line immediately behind the radiation beam impact location where the surface layer temperature is still near the melting point, said jet of molten metal coming from a reservoir where it was melted previously and its temperature raised far above the melting point, so that its excess energy is sufficient to melt the pre-heated surface of the metal parts to be joined, as soon as it impinges thereon,
   (d) letting the liquid metal from the jet and from the metal parts' surfaces intermix, (e) adjusting the flow of the metal jet to fill any gaps in the joint structure, and (f) letting all liquid metal solidify by spontaneous cooling, so as to form a solid metal connection between the parts subjected to this process.

3. A process as claimed in claim 1, where the radiation beam is a beam of electromagnetic radiation.

4. A process as claimed in claim 1, where the radiation beam is a beam of corpuscular matter.

5. A process as claimed in claim 2, where the radiation beam is a beam of electromagnetic radiation.

6. A process as claimed in claim 2, where the radiation beam is a beam of corpuscular matter.

7. A process as claimed in claim 1, where at least one of the metal parts to be joined and the liquid metal jet are of essentially different metals.

8. A process as claimed in claim 2, where at least one off the metal parts to be joined and the liquid metal jet are of essentially different metals.

* * * * *